Patented Nov. 11, 1941

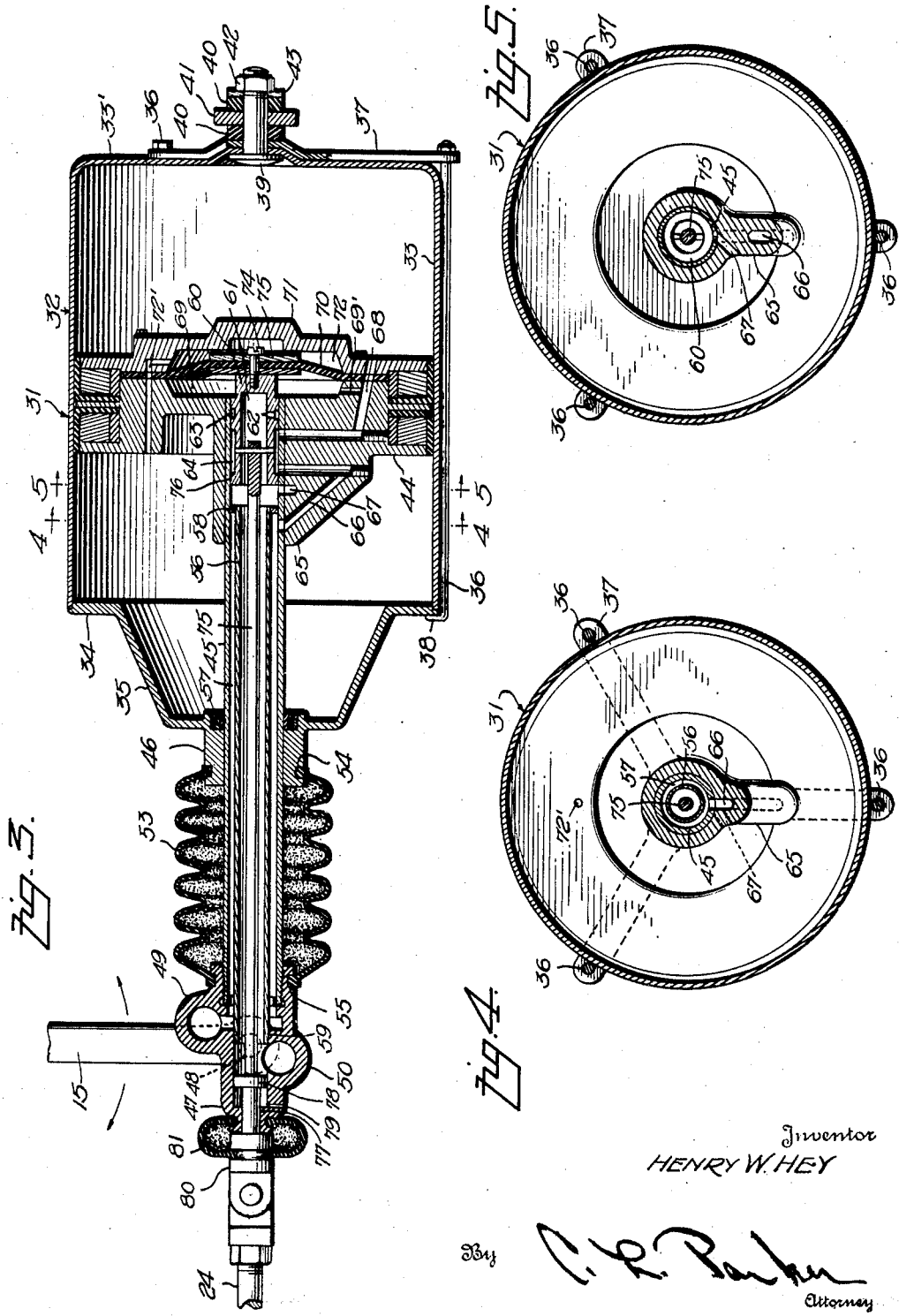

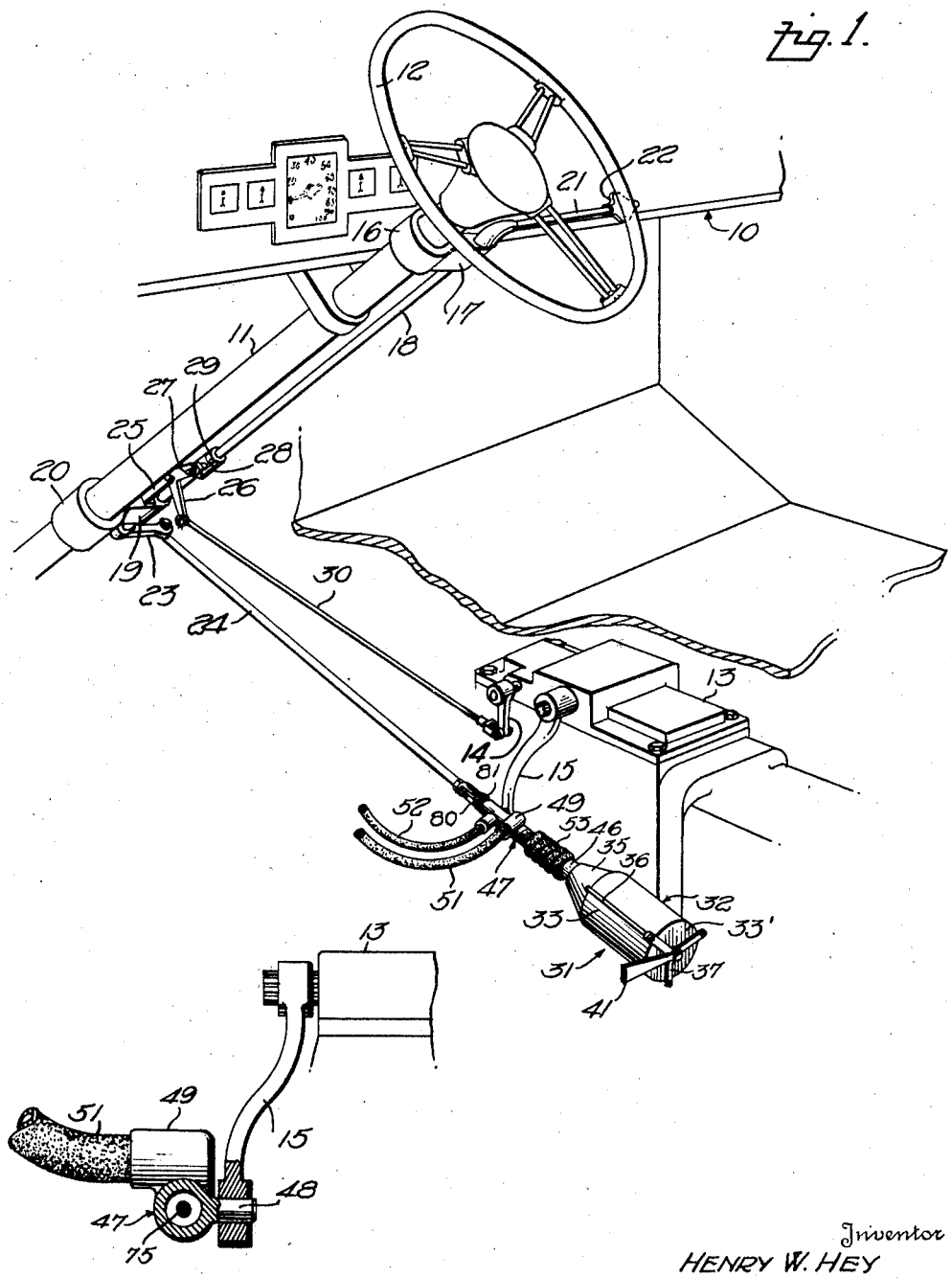

2,262,233

UNITED STATES PATENT OFFICE 2,262,233

GEAR SHIFTING MECHANISM FOR MOTOR VEHICLES

Henry W. Hey, Richmond, Va., assignor to Automatic Shifters, Inc., Richmond, Va., a corporation of Virginia Application January 22, 1940, Serial No. 315,067

8 Claims. (Cl. 74—335)

This invention relates to gear shifting mechanisms for motor vehicles.

Numerous types of power-operated gear shifting mechanisms for motor vehicles have been developed, a number of which are highly advantageous in operation. In some installations, however, disadvantages have been encountered with certain prior constructions due to their complications. For example, most prior power-operated shifting mechanisms employ a differential fluid pressure motor having a follow-up control valve mechanism for connecting the motor to the intake manifold of the motor vehicle engine. In order to provide the desired follow-up action and to provide the manually operated handle with "feel," it has been necessary to employ various types of walking beams or other leverage means in conjunction with the motor and its valve mechanism and connected to the manually operable handle.

Such installations cannot be employed with some motor vehicles because of the insufficient space available for the various cumbersome mechanisms involved. Moreover, in some motor vehicle transmissions shifting is accomplished by the swinging of a lever which is mounted to turn through such a great arc of movement between its two extreme positions that the prior mechanisms, while effective for power-operating the shift lever, do not provide sufficient movement for operating the lever manually in the event the shifting motor fails for any reason to operate. For example, in one well known motor vehicle, the shift lever is mounted to swing through an arc of 155 degrees between its two extreme positions of movement and the walking beams or other corresponding elements of prior constructions have prevented the manual swinging of the lever to its extreme positions in the event of a failure in power in the shifting motor.

It is now the common practice moreover to provide for the manual shifting of the gears of a motor vehicle from a handle arranged adjacent and beneath the steering wheel of the vehicle. Such handle is connected by suitable rods, levers, etc., to directly transmit movement to the transmission shift lever. Most prior power operated transmission shifting mechanisms have been of such type as to require substantial replacement of the parts conventionally employed for manually shifting the gears, thus involving substantial expense for the replacement of parts and an increased cost in installation due to the additional labor involved.

An important object of the present invention is to provide a greatly simplified and compact power-operated shifting mechanism wherein the space required for the entire mechanism is so minimized as to permit its use in modern vehicles where great difficulty has been involved in employing prior types of shifting mechanisms.

A further object is to provide a mechanism of this character wherein all walking beams and other similar expedients have been eliminated, thus minimizing the space required for mounting the mechanism and reducing the cost of manufacture of the complete mechanism.

A further object is to provide a power-operated shifting mechanism which lends itself particularly well to installation in vehicles having manual shifting means operated from a handle arranged beneath the steering wheel, the mechanism requiring the replacement of a minimum number of conventional parts.

A further object is to provide a mechanism of this character which completely eliminates the difficulties heretofore involved in providing for the manual shifting of the gears in the event of a failure of power in the shifting motor.

A further object is to provide a shifting mechanism wherein the valve-operating rod extending from the steering column is connected to transmit movement to the valve mechanism at a point in close proximity to the point at which power of the motor piston is applied to effect the shifting action whereby, upon a failure of power in the shifting motor, force is directly applied from the valve operating rod to such point of power application by the manual operation of the handle in almost exactly the same manner that manual shifting is accomplished in present day manual shifting mechanisms having shifting handles beneath the steering wheels of the vehicles.

A further object is to provide such a mechanism wherein the operator feels at all times a resistance to the movement of the handle which is substantially exactly proportional to the resistance encountered in each shifting operation, thus simulating conventional shifting of the gears without the operator having to employ the substantial force required for operating manual shifting mechanisms.

Other objects and advantages of the invention will become apparent during the course of the following description.

In the drawings I have shown one embodiment of the invention. In this showing:

Figure 1 is a fragmentary perspective view of a portion of a motor vehicle showing the invention applied, Figure 2 is an enlarged fragmentary end elevation of the transmission and associated elements, parts being broken away and parts being shown in section to illustrate the connection of the motor piston to the shift lever, Figure 3 is a central vertical longitudinal sectional view through the shifting motor and associated parts, Figure 4 is a transverse vertical sectional view on line 4—4 of Figure 3, and, Figure 5 is a similar view on line 5—5 of Figure 3.

Referring to Figure 1, the numeral 10 designates the vehicle as a whole having the usual steering column 11 and steering wheel 12. The usual power plant (not shown) delivers power through a transmission indicated as a whole by the numeral 13. Such transmission is provided with any conventional means for changing the gear ratio through the use of longitudinally shiftable elements which are selected for operation by the rocking of a lever arm 14, the selected shiftable member being moved by means of a rocking lever 15. The particular means for selecting and shifting the shiftable members may be of any desired type and forms no part per se of the present invention.

The steering column is shown as being provided with an upper bracket 16 having an extension 17 in which a rod or tube 18 is mounted to rock and slide. The lower end of the tube is supported by means of an extension 19 formed on a collar 20 carried by the steering column. An operating lever handle 21 is connected to the upper end of the tube in such a manner that movement of the handle parallel to the steering column rocks the tube 18, while movement of the handle transversely of the plane of the steering wheel effects axial sliding movement of the tube 18. The handle lever 21 may be provided with a suitable finger engaging element 22 to facilitate operation of the handle lever 21, the finger piece 22 preferably being constructed in accordance with my prior Patent No. 2,161,778, granted June 6, 1939.

The tubular member 18, its supporting means, and the handle lever 21 may form parts of a conventional manual shifting mechanism, and it will become apparent that the present invention is particularly adapted for use with such mechanism. In order to manually shift the gears by rocking the lever 15, the tubular member 18 is provided with a crank 23 to which is pivotally connected the forward end of a rod 24. This rod ordinarily is directly connected to the free end of the lever 15, but such connection is not employed in the present case, the rod 24 being employed for operating the valve mechanism of the shifting motor to be described.

In order to manually select the shiftable members for operation, axial sliding movement of the tube or rod 18 is employed for rocking the crank arm 14. For this purpose a bracket 25 is secured to the extension 19 and pivotally supports a bell crank lever 26, one arm of which is pivotally connected as at 27 to a sleeve 28 freely rotatable on the tube or rod 18. The sleeve 28 is fixed against axial movement with respect to the tube 18 by suitable collars 29, fixed to the tube 18 at opposite ends of the sleeve 28. One end of a rod 30 is connected to the other arm of the bell crank lever 26 and the other end of the rod is pivotally connected to the free end of the crank arm 14.

Referring particularly to Figures 1 and 3, the numeral 31 designates a motor-valve unit as a whole through which operation of the crank arm 15 is effected by power. This unit comprises a motor 32 having a cylinder 33 which may be formed of drawn steel with an integral head 33' at one end and a removable head 34 at the other end, the latter head being provided with a frustro-conical extension 35 for a purpose to be described. The head 34 may be retained in position by any suitable means such as hook bolts 36 extending through arms of a spider 37 lying against the cylinder head 33' and provided at their opposite ends with hooks 38 engaging the head 34.

A relatively heavy supporting pin 39 extends through the head 33' and through the center of the spider 37. The pin 39 carries a pair of deformable washers 40 engaging opposite sides of a bracket 41 which may be secured to the chassis of the vehicle or to any other suitable point. The stem 39 is provided with a nut 42 beneath which is a washer 43 engageable against the adjacent washer 40. It will become apparent that the supporting means for the cylinder permits it to rock within reasonable limits.

A piston 44 is reciprocable within the cylinder 32 and is provided with a tubular piston rod 45 slidable in a bearing 46 carried by the cylinder head 34. A connecting head indicated as a whole by the numeral 47 is carried by the free end of the piston rod 45. The head 47 carries a transversely extending pin 48 extending through the free end of the crank arm 15 to pivotally connect the piston rod 45 thereto. The head 47 carries two preferably integral transversely extending cylindrical portions 49 and 50 the former of which is connected by a flexible hose 51 to a source of non-atmospheric pressure, such as the intake manifold of the motor vehicle engine. The extension 50 forms the air inlet for the device and may communicate directly with the atmosphere or may be supplied with air through a flexible hose 52 leading to a suitable air cleaner (not shown) such as the carbureter air cleaner of the vehicle engine.

It will be obvious that reciprocation of the piston will turn the crank arm 15 and the axis of the pivot member 48 turns in an arc of a circle concentric with the turning axis of the crank 15. The deformable washers 40 permit the motor to alter its position in accordance with such turning movement of the crank arm 15. The piston rod 45 obviously slides through the bearing 46 to effect turning movement of the crank arm 15, and to exclude dust and other foreign material from the bearing 46, a rubber or similar boot 53 surrounds the piston rod and has its opposite ends seating in grooves 54 and 55 formed in the bearing 46 and head 47 respectively.

A tube 56 is arranged concentrically within the piston rod 45 and the annular space 57 between these elements forms the vacuum connection for the valve mechanism to be described, this space communicating with the interior of the extension 49. The right hand end of the tube 56 as viewed in Figure 3, is surrounded by a sealing collar 58 and the left hand end of the tube 56 has a snug or driving fit within an axial opening 59, formed in the head 47 and with which the interior of the air inlet extension 50 communicates.

From the foregoing it will be apparent that the space 57 forms the vacuum connection for the motor while the space within the tube 46 forms the air connection, and communication between opposite ends of the motor and the air and vacuum connections is controlled by a valve 60 slidable within the right hand end of the tubular connecting rod as viewed in Figure 3. This valve is provided with an axial cylindrical opening 61 extending throughout the greater portion of its length and directly communicating with the interior of the tube 56. The space 61 within the valve is provided with an axial opening 62 communicating with an annular groove 63 and this groove controls the admission of air into the right hand end of the cylinder 33, as will be described. The valve is further provided with an elongated vacuum groove 64 which controls connection of opposite ends of this cylinder 33 with the source of vacuum through the space 56.

The piston 44 is provided with an extended portion 65 and the frusto-conical cylinder head portion 45 is provided to receive the extension 65 to permit the piston 44 to move the desired distance within the cylinder 33. The extension 65 is provided with a passage 66 which maintains constant communication between the vacuum space 57 and the vacuum groove 64 of the valve. As shown in Figures 3 and 5 the extension 65 is provided with a downwardly and laterally extending port 67 which communicates at one end with the adjacent end of the cylinder 33. The other end of the port 67 is adapted to communicate either with the vacuum groove 64 or with the atmospheric space between the valve 60 and tube 56 depending upon the position of the valve, the latter, in the position of the part shown in Figure 3, uncovering the port 67 to the atmosphere. The piston 44 is also provided with a passage 68 communicating at one end with the right hand end of the cylinder 33 as viewed in Figure 3 and adapted to communicate at its opposite end with either the atmospheric groove 63 or vacuum groove 64, depending upon the position of the valve 60, and being shown in Figure 3 in communication with the vacuum groove 64. As the parts are shown in Figure 3, therefore, the piston will be moving toward the right, although the valve position is somewhat exaggerated and it will become apparent that movement of the piston takes place without ordinarily substantially completely uncovering of the ports 67 or 68.

The piston is recessed in one face to provide a chamber 69 and a flexible diaphragm 70 is arranged over such face of the piston and is secured in position by a cap 71. This cap is likewise chambered as at 72 to provide a pressure space, and it will be apparent that the diaphragm 70 is influenced by differential pressures in the chambers 69 and 72. Any pressure present in the right hand end of the cylinder 33 as viewed in Figure 3 is duplicated in the chamber 69 through a port 69' connecting this chamber to the passage 68. Similarly, any pressure present in the left hand end of the cylinder 33 is duplicated in the chamber 72 through a passage 72' communicating between such end of the cylinder and the chamber 72. Disks 73 of rigid material are arranged against opposite faces of the central portion of the diaphragm, and the disks and the diaphragm are secured to the adjacent end of the valve 60 by a screw 74.

A valve operating rod 75 extends axially through the tube 56 and the right hand end of this rod as viewed in Figure 3 is connected by a pin 76 to the valve 60. The remote end of the head 47 is provided with a bearing opening 77 through which the rod 75 extends and this rod is provided within the opening 59 of the head 47 with a cylindrical enlargement 78. The space between the member 78 and the adjacent end of the opening 59 is vented to the atmosphere as at 79. Outwardly of the head 47, the rod 75 is provided with a yoke 80 to which the rear end of the rod 24 is connected as shown in Figures 1 and 3. The inner end of the yoke 80 is normally spaced from the adjacent end of the head 47 and the same is true of the arrangement of the cylindrical enlargement 78 with respect to the adjacent end of the opening 77 in the head 47. Accordingly, the valve operating rod is movable a sufficient distance with respect to the piston rod to effect movement of the valve 60, but the movement of the valve operating rod is limited with respect to the piston rod to provide for manual operation for the crank arm 15 as will become apparent. The head 47 and yoke 80 may be connected by a rubber or similar boot 81 to prevent dust or other foreign material from entering the bearing 77.

The operation of the apparatus is as follows:

With the handle 22 in neutral position, that is, with the crank arm 15 and the shiftable elements in neutral positions, the operator may move the handle 22 toward or away from the steering wheel, depending upon the gear selection to be made. Assuming the vehicle is at a stand still and low gear is desired, the operator will move the handle 22 directly toward the steering wheel, which operation will axially move the rod 28 to rock the bell crank lever 26 and pull the rod 30, thus rocking the crank 14 to select the low and reverse gear shift rail for operation. While momentarily holding the handle 22 in such position, the operator will move the handle downwardly and rearwardly parallel to the steering wheel, which operation will effect the shift into low gear.

As soon as the handle 22 is moved downwardly and rearwardly in the manner indicated, the tube or rod 18 will be rocked on its axis and the arm 23 will be turned in the same direction as the handle 22, thus pushing the rod 24 rearwardly. Referring to Figure 3 it will be noted that this action moves the valve 60 to the right of its neutral position to connect the left hand end of the cylinder to the atmosphere through port 67, while the left hand end of the cylinder will be connected to the source of vacuum through passage 68, valve groove 64, passage 66, vacuum space 57, etc. Thus the piston 44 will start to move toward the right as viewed in Figure 3, which is the same direction as the valve 60 is being moved by the rod 75. If movement of the valve is stopped by the operator at any intermediate point in the movement of the handle 22, a slight additional movement of the piston 44 will cause the valve 60 and the piston to assume relative neutral positions in which case there will be a slight communication between both ends of the cylinder 33 and the atmosphere through passages 67 and 68. Pressure thus will be balanced in the cylinder and movement of the piston will be stopped. Accordingly, it will be apparent that the construction shown provides a follow-up action of the piston with respect to the valve mechanism, the piston always moving a distance corresponding to the distance of movement of the handle 22.

Assuming that the shift is being made into low gear, as stated, the operator will move the handle 22 in the manner described and the movement of the piston 44 toward the right in Figure 3 will rock the arm 15 in a counterclockwise direction as viewed in Figures 1 and 3 to effect the shift into low gear. Movement of the piston 44 is accomplished by the establishment of differential pressures in opposite ends of the cylinder 33 and these pressures are duplicated in the chambers 69 and 72. When the piston is moving toward the right as stated atmospheric pressure will be present in the left hand end of the cylinder in Figure 3 and such pressure is duplicated in the chamber 72 while the vacuum in the right hand end of the cylinder is duplicated in the chamber 69. Thus movement of the valve toward the right to effect movement of the piston in the same direction will be resisted by the differential pressures existing on opposite sides of the diaphragm 70.

The differential pressures required to move the piston 44 will depend upon the resistances encountered in the shifting operation. For example, when the shift is made out of neutral position toward the low gear position, which is the operation being considered, the motor means first overcomes the resistance offered by the neutral detent, and this requires the establishment of substantial differential pressures in the ends of the cylinder 33. Corresponding relative pressures will exist in the chambers 69 and 72, thus causing a proportionately greater resistance to the movement of the valve 60, this resistance being felt by the operator through the manual connections leading to the valve. After the resistance of the neutral detent is overcome there will be a period of shifting movement which takes place substantially without resistance, and immediately after the resistance of the neutral detent has been overcome the piston 44 will tend momentarily to move to the right relatively rapidly, thus quickly reducing the degree of communication between the passage 68 and the vacuum groove 64, while movement of the piston tends to reduce the vacuum in the vacuum groove 64, while reducing the pressure in the atmospheric end of the cylinder. Thus there will occur a rapid drop in differential pressures which will be duplicated in the chambers 69 and 72 and the resistance felt by the operator will be reduced to a proportionate extent.

Upon encountering the resistance of the synchronizing means, movement of the piston will be retarded while a slight additional movement of the valve 60 toward the right will again more widely open the degree of communication between the right hand end of the cylinder 33 and the source of vacuum, thus quickly dropping the pressure in the right hand end of the cylinder. The pressure will immediately correspondingly drop in the chamber 69, thus again offering proportionately great resistance to the movement of the handle 22 by the operator. Accordingly, it will be apparent that during the shifting movement described, a follow-up action of the piston with respect to the handle 22 is provided, and the operator will always feel a resistance to the movement of the handle which is almost exactly proportionate to the resistance encountered in the shifting operation.

After the low gear position has been reached the operator will engage the vehicle clutch, open the engine throttle and cause the vehicle to attain the desired momentum, whereupon he will disengage the clutch and make the shift into second gear. This is accomplished by moving the handle upwardly and forwardly parallel to the steering wheel until the neutral position is reached, whereupon the handle will be dropped directly away from the steering wheel to a position reversing the turning movement of the crank 14 through axial movement of the tube 18 to select the second and high gear shift rail or other shiftable element for operation. The operator will again move the handle 22 upwardly and forwardly parallel to the steering wheel to make the shift into second gear.

The shift into second gear is made with the piston standing approximately in the position shown in Figure 3 with the valve 60 pulled forwardly or to the left as viewed in Figure 3 to afford communication between the vacuum groove 64 and the passage 67, and to establish communication between the air groove 63 and the passage 68. The operation described for low gear will be repeated except that the piston will move toward the left as viewed in Figure 3. The valve 60 will be moving in the same direction and differential pressures in the chambers 69 and 72 will correspond with the pressures existing respectively in the right and left ends of the cylinder 33 as viewed in Figure 3, atmospheric pressure being present in the chamber 69 and vacuum in the chamber 72 to resist movement of the diaphragm 70.

After the shift has been made into second gear, the vehicle clutch is disengaged and the handle 22 is moved throughout its range of movement directly parallel to the steering wheel without being moved upwardly in the neutral position. The piston 44 under such conditions will be moved throughout its range of movement from the left hand end of the cylinder 33 as viewed in Figure 3 to the right hand end of the cylinder to assume the high gear position, the "feel" means functioning during such operation in the same manner as the shift into low gear previously described.

With the gears in neutral position the shift may be made into reverse by pulling the handle 22 directly toward the steering wheel and then moving it upwardly and forwardly parallel to the steering wheel, the valve and piston operating under such conditions in exactly the same manner as for the shift into second gear. Obviously the operator will feel the same resistance to movement of the handle 22 as for the other shifts, the "feel" means functioning in the same manner for all shifting operations.

It will be apparent that the arrangement of the valve mechanism shown eliminates the necessity for a valve mechanism externally of the motor and accordingly substantially reduces the space required for the mechanism as a whole. The same is true of the embodiment of the "feel" diaphragm 70 and its associated pressure chambers within the body of the piston. It will be apparent that the present mechanism completely eliminates the necessity for using walking beams and similar mechanical expedients for providing a follow-up action of the motor piston with respect to the shifting handle as has been true in many prior constructions.

As previously stated, the compactness of the apparatus is highly important in many modern motor vehicles wherein little space is available for the installation of power shifting mechanisms. In addition, much difficulty has been encountered in some installations in providing for the manual shifting of the gears in the event of a failure of power in the motor. The follow-up and "feel" employed in prior installations have been such as to provide insufficient manual movement to effect movement of the shift lever associated with the transmission between its extreme limits of movement.

In the present installation it will be noted that the pivot pin 48 (Figures 2 and 3) constitutes the point of application of the force of the motor for shifting the gears. It also will be noted that the rear end of the rod 24 terminates approximately at such point of application of power. In this connection it will be noted that the rear end of the yoke 80 (Figure 3) and the cylindrical enlargement 78 constitute means for limiting sliding movement of the valve operating stem 75 with respect to the head 47 through which power is delivered to the crank arm 15. If the motor 32 should fail to operate for any reason, the operator will move the handle 22 in the usual manner to take up play between either the yoke 80 or the enlargement 78 and the head 47, whereupon continued operation of the handle 22 will enable the operator to manually move the shift lever 15. It will be apparent that during the normal operation of the apparatus the yoke 80 moves a distance corresponding to the distance of movement of the pivot pin 48 and obviously is free to move the same distance plus the slight additional distance necessary to take up play between the parts referred to in order to effect a manual shift in the event of a failure of power in the motor. In other words, the operation of the rod 24 for either a power shift or a manual shift takes place substantially in the same manner, and the apparatus accordingly has been found wholly practicable for manually shifting, when necessary, transmission shift levers which swing through substantial arcs of movements. As previously stated, at least one motor vehicle in use today provides a shift lever 15 which swings through an arc of 155 degrees and it has been found that such lever cannot be shifted to its limits of movement with prior power shifting mechanisms, in the event of a failure of power, without providing some additional leverage means for stepping up the manual movement to take care of the substantial swinging movement of the shift lever. The present apparatus perfectly takes care of such operating conditions.

It also will be apparent that the present apparatus requires a minimum replacement of parts where installed in vehicles already provided with manually operable shifting mechanisms having a handle lever of the type shown in Figure 1 arranged beneath the steering wheel of the vehicle. As a matter of fact it sometimes is unnecessary to replace even a single part of the manual shifting mechanism in installing the present device. For example, it will be apparent that if the construction shown in Figure 1 is a manual shift with the power means attached thereto, the rod 24 will have been directly pivotally connected to the lever 15 to effect manual movement of the latter. The point of connection of the power means to the lever 15, namely the pin 48, is very close to the point of connection of the rod 24 to the yoke 80. In some installations it merely is necessary to disconnect the rod 24 from the lever 15, reset the lever 15 at a slight rearward angle to permit its connection to the pin 48, and then pivotally connect the rear end of the lever 24 to the yoke 80.

In other cases, the crank arm 23 (Figure 1) may be set at a slightly different angle forwardly of its normal position to move the rod 24 bodily forwardly to permit the connection of the rear end of the rod to the yoke 80 instead of to the crank 15. In other cases, the rear end of the rod 24 may be cut off and a new hole drilled to receive a pin for connecting it to the yoke 80, which operation may be quickly and easily accomplished. In still other installations where the rod 24 is normally pivotally connected to the shift lever 15 by having its end turned at right angles to extend through the opening of the bottom of the lever, the rear end of the rod may be cut off and bent to form a new pivot end engageable with the yoke 80.

Accordingly, it will be apparent that the present device in itself is relatively cheap to manufacture and that it requires substantially less space than is ordinarily required for power shifting mechanisms. It also will be apparent that costs are further reduced by eliminating the necessity for replacing conventional parts of a manual shifter of the type operable from a handle adjacent the steering wheel, and that the cost of installation, particularly as an accessory, is materially reduced by eliminating the time required, for dismantling parts of the conventional manual shifter and replacing them with other parts to adapt the power shifter for use. As distinguished from prior mechanisms the present apparatus is moreover particularly adapted for relatively easy and practical operation in effecting a manual shift in event of failure of power in the shifting motor.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In combination with a lever connected to a motor vehicle transmission and movable in opposite directions from a neutral position into different transmission setting positions, a differential fluid pressure motor arranged rearwardly of said lever and having a pressure movable member including a forwardly and upwardly extending tubular piston rod, a connecting member carried by said piston rod and having pivot means for connecting it to said lever, a follow-up control valve mechanism for said motor, a manually operable mechanism including an actuating rod extending upwardly and forwardly of said lever in alinement with said piston rod and extending to said connecting member, and a valve operating rod connected between said actuating rod and said valve mechanism through said piston rod, (said connecting member having an opening through which said valve operating rod is slidable and such rod having means engageable with said connecting member to provide limited relative movement therebetween whereby said valve operating rod is operable independently of said connecting member to operate said valve mechanism and whereby manual operation of said valve operating rod will effect movement of said connecting member to operate said lever upon a failure of power in said motor.

2. In combination with an element of a motor vehicle transmission movable in opposite directions from a neutral position into different transmission setting positions, a double-acting differential fluid pressure motor arranged rearwardly of said lever and having a pressure movable member including a forwardly and upwardly extending tubular piston rod, pivot means connecting said piston rod to said transmission element, a control valve mechanism for said motor arranged within said pressure movable member, a manually operable mechanism including a valve operating rod extending upwardly and forwardly of said lever in alinement with said piston rod and extending through said piston rod to operate said valve mechanism, said valve mechanism having two portions one of which is freely movable by said valve operating rod and the other of which is movable with said pressure movable member whereby the latter is caused to partake of a follow-up action with respect to said manually operable mechanism, means constructed and arranged with respect to said manually operable mechanism and said pivot means to transmit manual movement of a portion of the former adjacent said pivot means to the latter upon a failure of power in said motor, and a fluid pressure operated device carried by said pressure movable member and subject to differential pressures in opposite ends of said motor to provide a force reaction resisting movement of said manually operable mechanism in either direction of movement thereof in accordance with resistances encountered by said pressure movable member in moving said transmission element in either direction from neutral position.

3. In combination with a lever connected to a motor vehicle transmission and movable in opposite directions from a neutral position into different transmission setting positions, a double-acting differential fluid pressure motor arranged rearwardly of said lever and having a pressure movable member including a forwardly and upwardly extending piston rod, a connecting member carried by said piston rod and having pivot means for connecting it to said lever, a freely movable follow-up control valve mechanism for said motor, a manually operable mechanism including an actuating rod extending upwardly and forwardly of said lever in alinement with said piston rod and extending to said connecting member and having means connected to said valve mechanism, means connecting said actuating rod to said connecting member to provide limited relative movement therebetween whereby said actuating rod is operable independently of said connecting member to operate said valve mechanism and whereby manual operation of said actuating rod will effect movement of said connecting member to operate said lever upon a failure of power in said motor, and a fluid pressure operated device responsive to differential pressures in the ends of said motor and operative for effecting a force reaction on said manually operable mechanism in either direction of movement thereof opposing all movements thereof.

4. In combination with a lever connected to a motor vehicle transmission and movable in opposite directions from a neutral position into different transmission setting positions, a differential fluid pressure motor arranged rearwardly of said lever and having a pressure movable member including a forwardly and upwardly extending tubular piston rod, a connecting member carried by said piston rod and having pivot means for connecting it to said lever, a follow-up control valve mechanism for said motor, a manually operable mechanism including an actuating rod extending upwardly and forwardly of said lever in alinement with said piston rod and extending to said connecting member, a valve operating rod connected between said actuating rod and said valve mechanism through said piston rod, said connecting member having an opening through which said valve operating rod is slidable and such rod having means engageable with said connecting member to provide limited relative movement therebetween whereby said valve operating rod is operable independently of said connecting member to operate said valve mechanism and whereby manual operation of said valve operating rod will effect movement of said connecting member to operate said lever upon a failure of power in said motor, and a fluid pressure operated device carried by said pressure movable member and responsive to differential pressures in the ends of said motor, said device being connected to transmit a force reaction to said manually operable mechanism opposing all movements thereof.

5. A fluid pressure power mechanism comprising a double-acting differential fluid pressure motor having a pressure movable member therein and a tubular piston rod connected to such member, a power transmitting connection carried by said piston rod externally of said motor, a freely movable follow-up valve mechanism within said motor, an operating rod connected to said valve mechanism and extending through said piston rod, a manually operable rod arranged in axial alinement with said piston rod and directly connected to said valve operating rod, means affording a lost motion connection between said manually operable rod and said power transmitting connection to directly manually operate the latter in the event of a failure of power in said motor, and pressure responsive means carried by said pressure movable member and subject to pressures in opposite ends of said motor, said pressure responsive means having mechanical connection with said valve operating rod to transmit through the latter to said manually operable rod, in either direction of movement thereof, a force reaction proportional to the resistance encountered by said pressure movable member in either direction of movement thereof.

6. In combination with an element of a motor vehicle transmission movable in opposite directions from a neutral position into different transmission setting positions, a differential fluid pressure motor arranged rearwardly of said lever and having a pressure movable member including a forwardly and upwardly extending tubular piston rod, a head carried by the forward end of said piston rod, a pivot pin connecting said head to said transmission element, a control valve mechanism for said motor arranged within said pressure movable member, a manually operable mechanism including a valve operating rod extending upwardly and forwardly of said lever substantially in alignment with said piston rod and extending through said head and through said piston rod to operate said valve mechanism, said valve mechanism having two portions one of which is movable by said valve operating rod and the other of which is movable with said pressure movable member whereby the latter is caused to partake of a follow-up action with respect to said manually operable mechanism, a pair of elements carried by said manually operable mechanism and spaced from each other to provide lost motion connection between said manually operable mechanism and said head and selectively engageable with the latter to manually move it upon a failure of power in said motor, and a fluid pressure operated device carried by said pressure movable member and subject to differential pressure in opposite ends of said motor to provide a force reaction resisting movement of said manually operable mechanism in accordance with resistances encountered by said pressure movable member in moving said transmission element.

7. In combination with a lever connected to a motor vehicle transmission and movable in opposite directions from a neutral position into different transmission setting positions, a differential fluid pressure motor arranged rearwardly of said lever and having a pressure movable member including a forwardly and upwardly extending piston rod, a head carried by the forward end of said piston rod and having a pivot pin connecting it to said lever, a follow-up control valve mechanism for said motor, a manually operable mechanism including an operating rod extending upwardly and forwardly of said lever substantially in alignment with said piston rod and extending to said head, a valve actuating rod connecting said operating rod to said valve mechanism through said piston, said valve actuating rod being slidable in said head and provided with spaced enlargements providing relative movement between said valve actuating rod and said head and selectively engageable with said head to manually move it upon a failure of power in said motor, and a fluid pressure operated device responsive to differential pressures in the ends of said motor and operative for effecting a force reaction on said manually operable mechanism opposing all movements thereof.

8. A fluid pressure power mechanism comprising a differential fluid pressure motor having a pressure movable member therein and a tubular piston rod connected to such member, a head carried by said piston rod externally of said motor, a power transmitting element carried by said head, a follow-up valve mechanism within said motor, an actuating rod connected to said valve mechanism and extending through said piston rod and through said head, a manually operable rod arranged substantially in axial alignment with said piston rod and directly connected to said valve actuating rod, said valve actuating rod having a pair of spaced enlargements affording limited free movement between said actuating rod and said head and being respectively engageable with said head to manually operate the latter upon a failure of power in said motor, and pressure responsive means carried by said pressure movable member and subject to pressures in opposite ends of said motor, said pressure responsive means having mechanical connection with said valve actuating rod to transmit through the latter to said manually operable rod a force reaction proportional to the resistance encountered by said pressure movable member.

HENRY W. HEY.